April 29, 1958 C. T. BATTS 2,832,495
ADJUSTABLE SOLENOID CASINGS AND CLAMPS THEREFOR
Filed Jan. 27, 1953
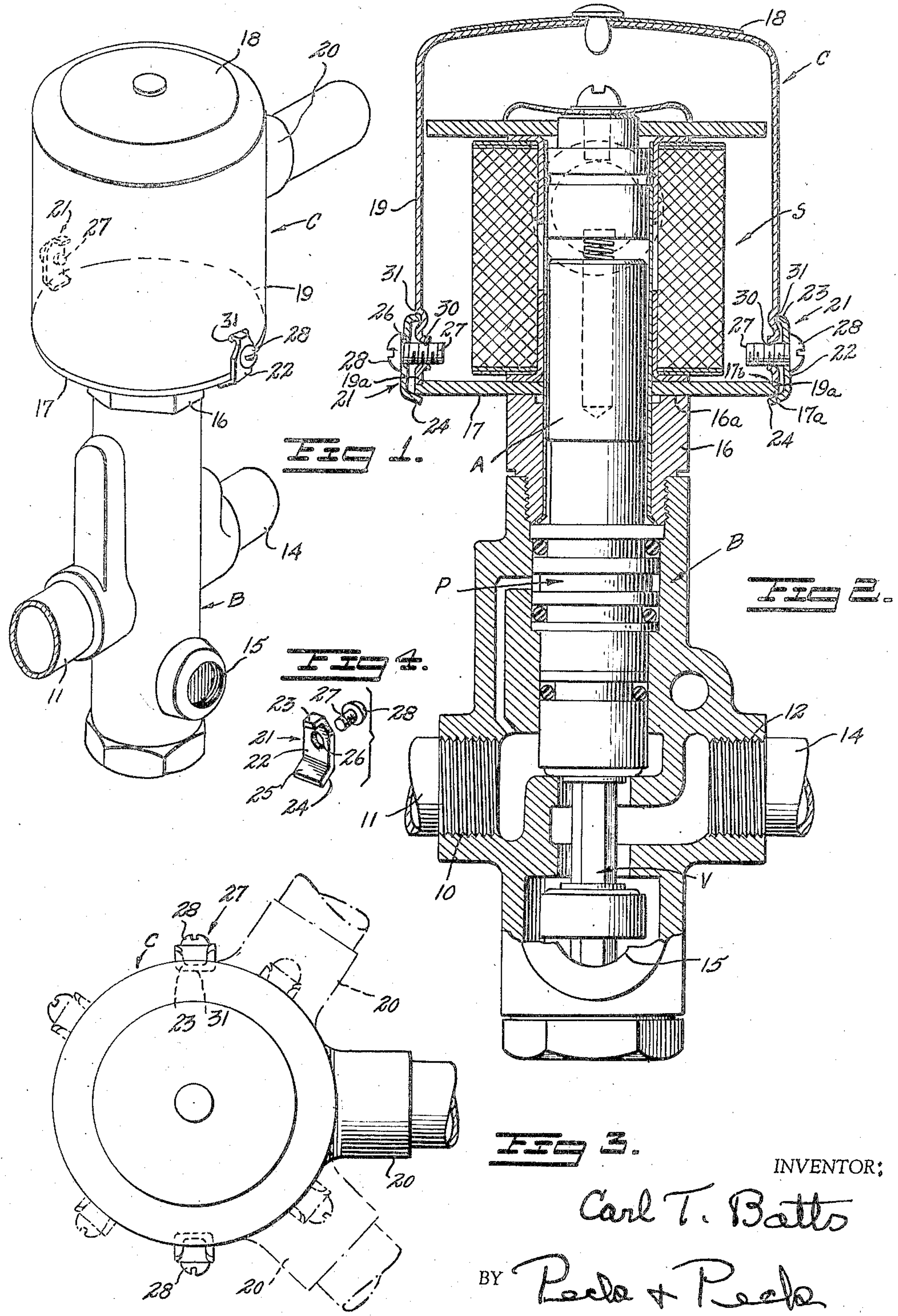
INVENTOR:
Carl T. Batts
BY Peck + Peck
ATTORNEYS.

United States Patent Office 2,832,495

Patented Apr. 29, 1958

2,832,495

ADJUSTABLE SOLENOID CASINGS AND CLAMPS THEREFOR

Carl T. Batts, San Marino, Calif.

Application January 27, 1953, Serial No. 333,594

4 Claims. (Cl. 220—3.7)

My present invention is directed to certain improvements in adjustable solenoid casings and clamps therefor; and the nature and objects of the invention will be readily recognized and understood by those skilled in the arts involved in the light of the following explanation and detailed description of the accompanying drawings illustrating an adaptation of what I now believe to be a preferred embodiment or mechanical expression of the invention from among various other expressions, adaptations, embodiments, constructions and combinations of which the invention is capable within the broad spirit and scope thereof as defined in the appended claims.

In the mounting and installation of valve units of the solenoid controlled types, and particularly such types of valve units intended for cycling pressure fluid to pressure fluid operated components of automatic machinery, certain difficulties are encountered in the mounting and installation thereof due to the problem of aligning the electrical conduit connection of the solenoid casing of a valve unit with the desired outlet connection or branch connection from the main electrical supply conduit system with which the casing conduit connection must be coupled. Such problems and the resulting difficulties and disadvantages are frequently aggravated with certain installations because of the relative inaccessibility of and the limited space available at the location at which a valve unit is required to be mounted.

Such types of valve units generally take a form in which the controlling solenoid is mounted on and at the exterior of the main body of the unit and is enclosed within a suitable casing. Usually the solenoid with its casing is mounted on and connected with the main body of the unit by a threaded coupling in order that the solenoid may be rotated to its final tightly connected position on and relative to the main body when necessary to complete the mounting and final installation of the unit. The casing for the solenoid usually provides an electrical conduit connection thereon which projects laterally therefrom generally radially relative to the axis of rotation of the solenoid and casing on the main body. Hence, it is not usually possible to predetermine the angular location of the casing conduit connection in the final installed position thereof, particularly if it has been necessary to rotate the solenoid with its casing into its final tightly secured position on the main body of the valve unit. If the final installed position of the casing does not happen to line-up the casing conduit connection with the connection of the conduit system with which it is to be coupled then it becomes impossible to utilize a straight-run or length of conduit to effect the connection. This necessitates the use of bends, angles, elbows or the like conduit connections and fittings with the increased time and labor and added cost of materials, for making the conduit connection.

It is a general object of my present invention to overcome the foregoing problem and its attendant difficulties and disadvantages by providing a structurally simple and efficient arrangement and construction of solenoid casing mounted for rotation to positions of angular adjustment together with clamps for releasably securing the casing in any position of adjustment to which rotated.

Another object is to provide a solenoid casing mounted for rotation in either direction to infinite positions of adjustment through a range of 360°, with structurally and functionally simple clamps mounted on the casing for quick attachment and release to and from positions securing the casing in an adjusted position without the necessity of removing the casing from its mounting or of removing the clamps from the casing.

A further object is to provide clamping members for mounting on an adjustably mounted solenoid casing for releasably securing the casing in a selected position of adjustment, which are capable of being quickly operated to either clamp the casing in or release it from an adjusted position.

Another object is to provide a solenoid casing rotatably mounted on a circular mounting base with an arrangement of diametrically oppositely located clamps mounted on the casing and being adapted to be releasably secured in wedging engagement with said circular mounting base to clamp said casing in any position to which it may be rotated on said base.

A further object is to provide a clamp for releasably securing an adjustable solenoid casing in an adjusted position on its mounting base, of a design and construction such that the clamp can be readily mounted on and carried by the solenoid casing in an accessible position by a simple screw which is also capable of functioning to secure the casing in and release it from clamping position on the casing by mere rotation of the mounting screw.

Another object is to provide a casing clamp of simple structural design adapted to low cost production and capable of being readily mounted on a casing by a simple screw mounting without requiring any major or substantial structural changes in the casing on which the clamp is to be mounted.

And a further object is to provide such a clamp adapted for wedging engagement with the mounting structure for the casing so that the clamp will be self-adjusting under all conditions of operation and use and in all positions of adjustment of the casing.

With the foregoing and various other objects, features and results in view which will be readily apparent from the following detailed description, my invention consists in certain novel features in design and construction and in combinations and arrangements of components, all as will be more fully and particularly referred to and specified hereinafter.

Referring to the accompanying drawings in which similar reference characters refer to corresponding parts and elements throughout the several figures thereof:

Fig. 1 is a perspective view of a solenoid controlled valve unit incorporating a solenoid casing and clamps of a design and arrangement of my invention.

Fig. 2, is a view in longitudinal section through the value unit of Fig. 1, showing the casing clamps in position securing the solenoid casing in an adjusted position.

Fig. 3 is a view in top plan of the solenoid casing and showing in dotted lines several positions of angular adjustment thereof.

Fig. 4, is a persepective view of one of the casing clamps.

A pressure fluid cycling valve unit of the pilot actuated type having a controlling solenoid with an enclosing casing adjustably mounted at one end of the valve unit, is disclosed herewith as presenting the problem for which my present invention offers a solution. It is not intended to limit the invention to embodiment and use solely on this particular type, design and construction of valve unit, or to casings for the solenoid of a valve unit or to casings for a solenoid, where a casing in other settings, combinations and mechanisms encounters conditions which present adjustable casing problem analogous to that encountered with a valve unit of the type of this selected example.

Referring to the drawings, the valve unit of the example includes a generally elongated valve body B within which there is housed a main valve organization V adjacent one end of the body and a pilot valve organization P located within the body between the main valve organization V and the opposite end of the body. The main body B has an inlet 10 into which there may be threaded an inlet pipe 11, and, in this instance, an outlet 12 opposite the inlet 10, into which there may be threaded the outlet pipe 14. Thus, in mounted and installed position the valve unit is connected into a pressure fluid line comprised of the inlet pipe 11 and outlet pipe 14, in relatively fixed position and hence, cannot be adjusted angularly about its longitudinal axis. In this particular form of valve unit, the body B is provided with an exhaust 15 which may be open to atmosphere or which may have any suitable exhaust line (not shown) threaded thereinto.

At the end of the valve body B opposite the main valve organization V therein, which is usually the upper end in mounted position of the unit, there is provided a solenoid S having an armature A suitably connected into the pilot valve organization P for controlling the operation of the latter organization.

This solenoid S is suitably mounted on the outer end of a coupling member or adapter 16 which is threaded into the adjacent end of the body B and which has attached on its outer end 16*a* a circular mounting disc 17 disposed in a plane normal to the longitudinal axis of the valve unit and the solenoid S.

The solenoid S is covered by and enclosed within a circular casing C of general cup-like form having an outer end or top wall 18 and an annular side wall 19, with the inner or bottom end of the casing being open. The casing C is positioned down over the solenoid S onto the mounting disc 17 at the outer end of the coupling member 16, with the edge 19*a* of the casing at and around the open end thereof seated and slidably engaged on the mounting disc 17 which thus forms the end closure for the casing in mounted position thereof, as will be clear by reference to Fig. 2. The casing C is of generally circular cross section with the annular edge 19*a* thereof at the open end of the casing being truly circular and in mounted position of the casing being concentric with the longitudinal axis of the valve unit and the solenoid S.

In this example adaptation of my invention the outer side of the mounting disc 17 is formed with a peripheral recess therearound concentric with the axis of the disc to form an annular seating flange 17*a* and a circular bearing surface 17*b* normal to the flange around the inner periphery of the flange. The flange 17*a* and circular bearing surface 17*b* are both concentric with the axis of the disc and the internal diameter of the bearing surface 17*b* is substantially equal to the internal diameter of the edge portion 19*a* of the casing C. In mounted position of the casing C on the mounting disc 17, the circular edge portion 19*a* of the casing is received on the seating flange 17*a* and the inner surface thereof has a sliding, bearing fit on and against the circular bearing surface 17*b* to thereby permit of free rotation of casing C in either direction on the mounting plate 17 about the axis of that plate as a center. So mounted the casing C is adapted to rotation on the mounting disc 17 to infinite positions of angular adjustment thereon and therearound.

As it is necessary to run electrical current supply wires to the solenoid S, and as these wires must be housed within suitable electrical conduits, the casing C is provided with a laterally outwardly extending and radially disposed conduit connection in the form of the hollow neck or sleeve 20 which opens through the wall 19 and which may be suitably internally threaded for the threading thereinto of the electrical conduit for the supply wires to the solenoid S, as will be readily understood by those familiar with the mounting, installation and electrical connection of this type of unit.

In the installation of the valve unit of this example, it is essential that the coupling 16 be threaded tightly down into the internally threaded end of the body B in the final installed position of the unit, so that, when the valve body B is installed in position connected to the pressure fluid lines 11 and 14, it is not possible to predetermine the angular position which the condiut connection 20 of casing C will take in the final installed position of the valve unit. Hence, it is extremely desirable that the casing C be capable of rotation on and relative to the mounting disc 17, so that the casing may be rotated through any desired or required number of degrees of rotation on disc 17 in order to angularly adjust the conduit connection 20 to a position at which it is in line with the conduit connection with which it is to be coupled. This avoids the difficulties and expense in coupling up a conduit connection with the connection 20 which is not properly lined-up, as hereinabove explained.

In accordance with my invention, I provide and combine with the casing C and disc 17, the releasable clamps 21 which are mounted on and carried by the casing for securing that casing in any position of angular adjustment on mounting disc 17 as may be required to line-up conduit connection 20 with the connection to which it is to be coupled. These clamps 21 are each in the form of a plate-like body 22 having at one end thereof a reduced width lip 23 extended laterally from one side of the body and having at the opposite end a wedging or camming flange or jaw 24 bent-up or otherwise formed to extend laterally from the same side as said lip 23 but, in this instance, for the full width of the body. The camming flange 24 of each clamp 21 is disposed at an angle to the plane of the body of the clamp to incline the flange outwardly from the body in a direction away from lip 23 at the opposite end of the body. The camming flange 24 thus provides at the inner side thereof the outwardly inclined jaw or camming surface 25 for camming engagement under and against the peripheral edge portion of the mounting disc 17, as will be explained fully herebelow. Each clamp 21 is provided with a smooth wall bore 26 through the body 22 thereof intermediate the lip 23 and camming flange 24, adapted to receive therethrough the mounting and operating screw 27 for the clamp. Each screw 27 is provided with the slotted head 28, and may be in the form of a standard or stock screw, thus eliminating the necessity for specially made screws. In this specific example each of the clamps 21 is formed of a suitable material, such as tempered spring steel, and is substantially rigid to the extent that it will yieldingly take, without deformation, the forces applied thereto by the mounting screws 27 in the operation of the clamp to and its maintenance in clamping position.

In the adaptation of the invention to the solenoid casing C of the type of valve unit of this example, two (2) clamps 21 are utilized and these clamps are mounted on the side wall 19 of the casing C at diametrically opposite locations. To this end the side wall 19 of the casing C is provided at diametrically opposite locations thereon with the internally threaded bores 30 therethrough in axial alignment across the casing, adjacent but spaced inwardly a distance from the open end edge portion 19*a* of the casing side wall 19. The wall 19 is indented or depressed at a location spaced a distance inwardly from each bore 30 to provide the outwardly open recess 31 adapted to receive therein the lip 23 of a clamp 21. The distance between the center of each bore 30 and the center of the adjacent recess 31 is equal to the distance between the center of the bore 26 in a clamp 21 and the center of the lip 23. The distance between the center of a bore 30 and the plane of the underside of the mounting disc 17 with the casing C in position thereon, is less than the distance between the center of the bore 26 in a clamp 21 and the outer end edge of the camming flange 24 of a clamp, but greater than the distance between the bore center and the inner edge of the flange.

Each clamp 21 is mounted in position on the casing C by passing a mounting screw 27 through the bore 26 in the clamp with the head 28 thereof in position to engage against the outer side of the clamp body 22, and then threading the screw 27 into a bore 30 of wall 19 of the casing into position with the lip 23 of the clamp loosely positioned in the adjacent recess 31 in the wall 19. In mounted position with the lip 23 in its casing wall recess 31, the camming flange will be then positioned extending loosely under the mounting disc 17, that is, in position for engaging the side of the disc opposite the side on which the casing is mounted, as will be clear by reference to Fig. 2. With the lip 23 of a clamp received in a recess 31, the clamp is restrained by engagement of the lip with the lower wall of the recess against bodily movement or displacement of the clamp longitudinally on the casing toward the mounting disc. Thus the lips and recesses provide means which insure the proper positioning of the clamps to locate the wedging flanges 24 thereof for wedging engagement with the side of the mounting disc opposite the side from which the casing is mounted. With the clamps 21 thus attached at diametrically opposite locations on the casing C, the casing is then mounted in position on the mounting disc 17 of the valve unit with the peripheral edge portion **19*a* of the casing rotatably seated on the flange 17*a* in bearing engagement with the surface 17*b*. The casing C is thus freely rotatable in either direction in disc 17 about the longitudinal axis of the valve unit to infinite positions of angular adjustment thereon. In this mounted position the clamps 21 are themselves positioned with the camming flanges 24 thereof extended under the peripheral edge portion of the mounting disc 17 in positions for engagement of their inclined camming surfaces 25 with such peripheral edge portions when forced into clamping positions by the clamping screws 27**.

After the casing C is rotated to its desired position of adjustment on the disc 17, the screws 27 by which the clamps 21 are mounted on the casing C, are then threaded into their respective bores 30 in wall 19 into tightly secured position with the screw heads 28 bearing against the rigid clamp bodies 22. Such operation forces the clamps 21 bodily inwardly with the flanges 24 of each clamp being forced into tight camming engagement under and against the peripheral portion of the mounting disc 17 adjacent thereto and with which the flange is in engagement. The casing C may thus be tightly secured in an adjusted position against inadvertent displacement by merely threading each mounting screw 27 into position tightly forcing the clamp to secure the casing against rotation until the clamp is released. In order to release the casing C for adjustment it is only necessary to make a quick, limited rotation of each mounting screw 27 to thread the screw a short distance outwardly through its casing wall bore 30 sufficient to release the clamp from camming engagement under the mounting disc 17. It is to be here noted that in clamping position securing the casing in adjusted position, each clamp 21 bridges across and is spaced from the edge portion **19*a* of the casing and the peripheral edge of the mounting disc 17** (see Fig. 2).

In the installation of a valve unit, such as that of the instant example, embodying the solenoid casing C and the clamps 21 of the invention, the unit is coupled into the pressure fluid lines at the required location for the unit. Then, if upon completion of the final installation in the pressure fluid lines, the conduit connection 20 of casing C does not happen to line-up with the conduit connection from the electrical supply system with which it is to be coupled, or if it has been necessary to further rotate the coupling member 16 on which the solenoid S and its casing C are mounted in order to obtain the final tightened position of that coupling so that casing conduit coupling 20 is positioned out of alignment, it is only necessary in order to line-up conduit connection 20, to loosen the clamp mounting screws 27 and then manually rotate casing C on mounting disc 17 until conduit connection 20 is in the required position to line it up. After the casing C is rotated to the desired position of adjustment the operator can by using a suitable tool, such as a screw driver, readily tighten-up mounting screws 27 by a quick turn of each to thereby force the clamping flanges 24 into camming engagement under and engaged with mounting disc 17 to thereby tightly secure the casing in its adjusted position. In Fig. 3 of the drawings several positions of adjustment of casing C to locate conduit connection 20 in selected positions, are indicated. It is to be particularly noted that in the adjustment operations it is unnecessary to either remove the clamps from the casing or the casing from its mounted position. It is to be further noted that not only are the clamps mounted and secured in what are normally permanent positions on the casing by the mounting screws 27, but that these mounting screws also function as the only operating elements required for releasing the clamps from and engaging the clamps in casing securing position.

Due to the construction and arrangement of the mounting disc, the casing and the clamps in accordance with my invention, it is possible to readily and quickly remove the casing from the mounting disc and to replace the casing on the disc without requiring special tools and with a minimum of effort. This is a considerable advantage in the event it becomes necessary to remove and replace a burned out coil of the solenoid S.

While I have shown in the instant example an embodiment of the invention which utilizes only two (2) clamps, it is to be understood that this embodiment is not disclosed by way of limitation but only for purposes of example, as a number of clamps can be used if desired or found expedient, particularly when the casing and clamping arrangement and construction of the invention is utilized on larger diameter casings and it is found necessary to more tightly engage the casing in its mounted and seated position on a mounting structure.

It will also be evident to those skilled in the art that various changes, variations, modifications, substitutions, eliminations and additions might be resorted to without departing from the broad spirit and scope of my invention, and hence I do not intend or desire to limit my invention in all respects to the exact and specific disclosures hereof, except as may be required by clearly intended specific limitations thereto appearing in any of the appended claims.

What I claim is:

1. In combination, a mounting base having an outer edge portion therearound; said mounting base having a seat on one side thereof; a casing including a side wall therearound open at one end thereof and being formed to provide around said open end an edge portion received and engaged on and constrained against lateral displacement by said seat for movement of said casing in either direction to selected positions of adjustment on and around said base; mounting members on said side wall of said casing spaced from said mounting base at locations spaced apart therearound and extending laterally outwardly therefrom; a substantially rigid clamp loosely mounted on each of said mounting members in position at the exterior and disposed longitudinally of said casing extending across said outer edge portion of said mounting base; each of said clamps being formed at the end thereof located at the side of said outer edge portion of said mounting base opposite the side thereof on which said casing is mounted with an inwardly extending camming portion having the inner surface thereof inclined outwardly to form a camming surface for engaging such side of said outer edge portion of said base; means on the end of each clamp opposite said camming portion end thereof for maintaining said clamp against movement longitudinally of said casing; and means on each of said mounting members movable inwardly relative to said clamp mounted on said mounting member to position engaged against said clamp to force said clamp inwardly to and releasably secure in it position with said outwardly inclined camming surface of said camming portion tightly engaging the side of said outer edge portion of said base opposite the side thereof on which said casing is mounted to rigidly clamp said casing to said mounting base.

2. In the combination of claim 1, said means on the end of each of said clamps opposite said camming portion end thereof projecting inwardly and releasably engaged with said casing securing said clamp against movements longitudinally of said casing toward said mounting base.

3. In combination, a mounting base having on one side thereof a seat; a casing including a side wall therearound open at one end thereof and being formed to provide around said open end an edge portion received and engaged on and constrained against lateral displacement by said seat in position thereon for movement of said casing in either direction to selected positions of adjustment on and around said base; mounting members on said side wall of said casing spaced from said mounting base at locations spaced apart around and extending laterally outwardly from said side wall of said casing; a substantially rigid clamp loosely mounted on each of said mounting members in position at the exterior and disposed longitudinally of said casing extending across the adjacent edge portions, respectively, of said mounting base; each of said clamps at one end thereof having an inwardly extending camming portion having the inner surface thereof turned outwardly and inclined inwardly relative to the inner side of said clamp forming a camming surface thereon, and at the opposite end thereof being provided with means integral therewith releasably engaged with said casing securing said clamp against longitudinal movements with respect to said casing; and means on each of said mounting members movable inwardly relative to said clamp on said mounting member to position engaged against and forcing said clamp inwardly to releasably secure said clamp in position with said outwardly inclined camming surface of said camming portion at one end thereof tightly engaged against the side of said base opposite the side thereof on which said casing is mounted and said integral means at the opposite end thereof engaged against said casing side wall.

4. The combination set forth in claim 3, wherein the means integral with the end of each clamp opposite the camming portion end thereof extends laterally inwardly into releasable engagement with said casing side wall, and said casing side wall is provided with recesses receiving said laterally inwardly extending means of said clamps, respectively, restraining said clamps against movements longitudinally on said casing side wall toward said mounting base.

References Cited in the file of this patent

UNITED STATES PATENTS

| | | |
|---|---|---|
| 1,667,656 | Dilzell | Apr. 24, 1928 |
| 1,863,793 | Hermani | June 21, 1932 |
| 1,943,739 | Nowosielkski | Jan. 16, 1934 |
| 1,991,160 | Knight | Feb. 12, 1935 |
| 2,096,763 | Ray | Oct. 26, 1937 |
| 2,297,279 | Attwood | Sept. 29, 1942 |
| 2,384,310 | Judd | Sept. 4, 1945 |
| 2,644,709 | Diesel | July 7, 1953 |

FOREIGN PATENTS

| | | |
|---|---|---|
| 14,486 | Great Britain | Apr. 14, 1910 |
| 207,364 | Great Britain | Nov. 29, 1923 |